(12) United States Patent
Conradie et al.

(10) Patent No.: US 10,724,117 B2
(45) Date of Patent: Jul. 28, 2020

(54) METHOD OF RECOVERING BASE METALS FROM LOW GRADE ORES AND RESIDUES

(71) Applicant: SIRCH GROUP (PTY) LTD., Randvaal (ZA)

(72) Inventors: Nicholas Conradie, Olifantsfontein (ZA); Marthie Kotze, Randvaal (ZA)

(73) Assignee: SIRCH GROUP (PTY) LTD., Randvall (ZA)

( * ) Notice: Subject to any disclaimer, the term of this patent is extended or adjusted under 35 U.S.C. 154(b) by 505 days.

(21) Appl. No.: 15/320,063

(22) PCT Filed: Jun. 18, 2015

(86) PCT No.: PCT/ZA2015/000045
§ 371 (c)(1),
(2) Date: Dec. 19, 2016

(87) PCT Pub. No.: WO2015/196220
PCT Pub. Date: Dec. 23, 2015

(65) Prior Publication Data
US 2017/0152583 A1 Jun. 1, 2017

(30) Foreign Application Priority Data
Jun. 18, 2014 (ZA) .................................. 2014/04452

(51) Int. Cl.
*C22B 11/08* (2006.01)
*C22B 15/00* (2006.01)
(Continued)

(52) U.S. Cl.
CPC ............ *C22B 11/08* (2013.01); *B01D 61/022* (2013.01); *B01D 61/145* (2013.01); *C22B 3/06* (2013.01); *C22B 3/22* (2013.01); *C22B 11/04* (2013.01); *C22B 15/008* (2013.01); *C22B 15/0071* (2013.01); *C22B 15/0076* (2013.01); *C22B 15/0086* (2013.01); *C22B 15/0089* (2013.01);
(Continued)

(58) Field of Classification Search
None
See application file for complete search history.

(56) References Cited

U.S. PATENT DOCUMENTS 3,681,055 A * 8/1972 Little .................. C22B 15/0063
205/480
5,961,833 A 10/1999 Green et al.
(Continued)

FOREIGN PATENT DOCUMENTS

WO WO 01/62993 8/2001

OTHER PUBLICATIONS

International Search Report, PCT/ZA2015/000045, dated Apr. 20, 2016.
(Continued)

*Primary Examiner* — Anita Nassiri-Motlagh
(74) *Attorney, Agent, or Firm* — Young & Thompson

(57) ABSTRACT

A method of recovering a metal from a low-grade ore which is subjected to cyanide leaching to produce a PLS which contains a metal cyanide which is removed from the PLS by ultrafiltration and nano-filtration, and then acidified and sulphidised to produce a metal sulphide from which the metal is extracted, and hydrogen cyanide which is recycled to the cyanide leaching step.

4 Claims, 3 Drawing Sheets

(51) Int. Cl.
*C22B 3/06* (2006.01)
*C22B 3/00* (2006.01)
*C22B 3/22* (2006.01)
*B01D 61/02* (2006.01)
*B01D 61/14* (2006.01)

(52) U.S. Cl.
CPC ...... *C22B 23/0407* (2013.01); *B01D 2311/25* (2013.01); *Y02P 10/234* (2015.11); *Y02P 10/236* (2015.11)

(56) References Cited

U.S. PATENT DOCUMENTS 6,156,186 A * 12/2000 Mueller ................ C22B 3/0005
  205/560
6,355,175 B1 * 3/2002 Green .................. B01D 61/022
  210/639

OTHER PUBLICATIONS

M. Stewart et al: "SART for copper control in cyanide heap leaching", Dec. 1, 2012 (Dec. 1, 2012), pp. 1037-1043. XP055263836, Retrieved from the Internet:URL:http://www.scielo.org.za/pdf/jsaimm/v112n2/11. pdf [retrieved on Apr. 8, 2016] the whole document.
Written Opinion, PCT/ZA2015/000045, dated Apr. 20, 2016.

* cited by examiner

METHOD OF RECOVERING BASE METALS FROM LOW GRADE ORES AND RESIDUES

BACKGROUND OF THE INVENTION

This invention relates to a method of recovering metals from low grade ores and residues. More particularly, the invention is concerned with increasing the economic viability of recovering base or other metals by means of cyanide leaching of low grade ores and residues by providing a method for the effective recovery of cyanide, contained in a lixiviant to the leach process, which allows for the recovered cyanide to be recycled.

Without being restrictive "low grade ores", as used herein, includes oxide and sulphide ores, especially ores containing high acid-consuming gangue materials such as calcite, dolomite, calcium, magnesium, aluminium, manganese and iron.

The recovery of base metals such as copper, nickel, cobalt and zinc from low grade ores by means of sulphuric acid leaching is often considered uneconomical, at least for the following reasons:
1. the amount of acid, which is a costly reagent, consumed during the leaching of gangue materials such as the aforementioned is relatively high;
2. base metal ores or residues containing sulphides are not leached efficiently in sulphuric acid and, for most sulphide materials, an oxidant such as ferric must be employed. The cost of the oxidant is normally unacceptably high; and
3. during sulphuric acid leaching precious metals such as gold, silver and platinum are not leached and an acid residue must be further processed by cyanidation to recover these metals.

Although the cyanidation of low grade ores can be very effective in recovering base metals and precious metals, the high levels of free cyanide that are required to ensure effective leaching have a detrimental effect on the economic viability of the process.

Several methods for recovering cyanide, following a cyanidation process, have been developed so that the recovered cyanide can be recycled in order to make the cyanidation process more economical. One method, referred to as the SART process, used for recovering gold from copper-gold ores, has shown promise.

A basic flow sheet of the SART process is shown in FIG. 1. The process includes the following steps: leaching the ore with cyanide to form a solution which is subjected to a first solid/liquid separation step to produce a pregnant leach solution (PLS) and solids; acidification of the PLS using $H_2SO_4$; followed by sulphidisation by means of the addition of $H_2S$, to produce a solution containing a metal sulphide complex, which is subjected to a second solid/liquid separation step, such as activated carbon filtration or ion exchange, to form a filtrate and a filtered liquor. Copper, gold and silver are recovered from the filtrate and the pH of filtered liquid is adjusted before recycling to the leaching step. The solids from the first solid/liquid separation step are washed and subjected to a cyanide destruction step to form a detoxified product which is disposed of in a slimes dam.

The SART process is primarily used for gold recovery. To the applicant's knowledge the SART process has not been considered for the treatment of low grade base metal ores or residues, for the quantity of base metal which would be recovered would not normally justify the high cost of the reagents.

An object of the present invention is to provide a method which, at least partially, addresses the problem associated with these high costs.

SUMMARY OF THE INVENTION

The invention provides a method for the recovery of at least one metal from a low grade ore or residue, wherein the method includes the following steps:
a) cyanide-leaching the low grade ore or residue, at an alkaline pH, to produce a pregnant leach solution which contains at least one metal cyanide;
b) upgrading the pregnant leach solution by removing leached or barren solids from the pregnant leach solution containing the metal cyanide;
c) subjecting the upgraded pregnant leach solution to ultra-filtration to produce a clarified liquor containing the metal cyanide;
d) subjecting the clarified liquor to nano-filtration to produce a metal cyanide concentrate and a permeate;
e) subjecting the metal cyanide concentrate to acidification and then to sulphidisation to produce a solution which contains a metal-sulphide and hydrogen cyanide;
f) subjecting the solution formed in step e) to a solid liquid separation step thereby to recover at least some of the metal sulphide and at least some of the hydrogen cyanide; and
h) recycling the recovered hydrogen cyanide to the cyanide leaching (step a)).

The cyanide leaching step a) is conducted at a pH which preferably is between 10 and 11.

The removal of the leached or barren solids from the pregnant leach solution in step b) may be effected by means of counter-current decantation, filtration or the like.

In order to optimise the recovery of the metal sulphide and the hydrogen cyanide, the leached or barren solids may be subjected to a washing step. A resulting solution is then separated into a wash water which is recycled to the upgraded pregnant leach solution, and a washed leach residue which may then be subjected to a cyanide destruction step.

The nano-filtration in step d) may be carried out using any suitable membrane having an appropriate pore size to prevent the metal cyanide concentrate from permeating the membrane.

The permeate produced in step d) may be recycled to the cyanide leaching step a).

In the acidification of the metal cyanide concentrate (in step e)) the pH of the concentrate may be lowered to a value of between 2 and 6. This may be done by the addition of sulphuric acid. The lowering of the pH causes the metal cyanide concentrate to dissociate and form a solution which contains metal-sulphate and hydrogen cyanide.

In the subsequent sulphidisation process, which is preferably effected by adding sulphide in the form of hydrogen sulphide or sodium sulphide, the metal sulphate in the solution is sulphidised to form the stream which contains metal sulphide.

The permeate which is produced in step d) is, in a variation of the invention, subjected to a reverse osmosis process to form a high quality water stream and a NaCN concentrate which is recycled to the cyanide leaching step a).

The metal may be extracted from the metal sulphide by any suitable means known in the art. The metal recovered may be base metal, such as copper, nickel, cobalt or zinc, or precious metal, such as gold or silver.

BRIEF DESCRIPTION OF THE DRAWINGS

The invention is further described by way of examples with reference to the accompanying drawings in which.

DESCRIPTION OF PREFERRED EMBODIMENTS

Figure 2:
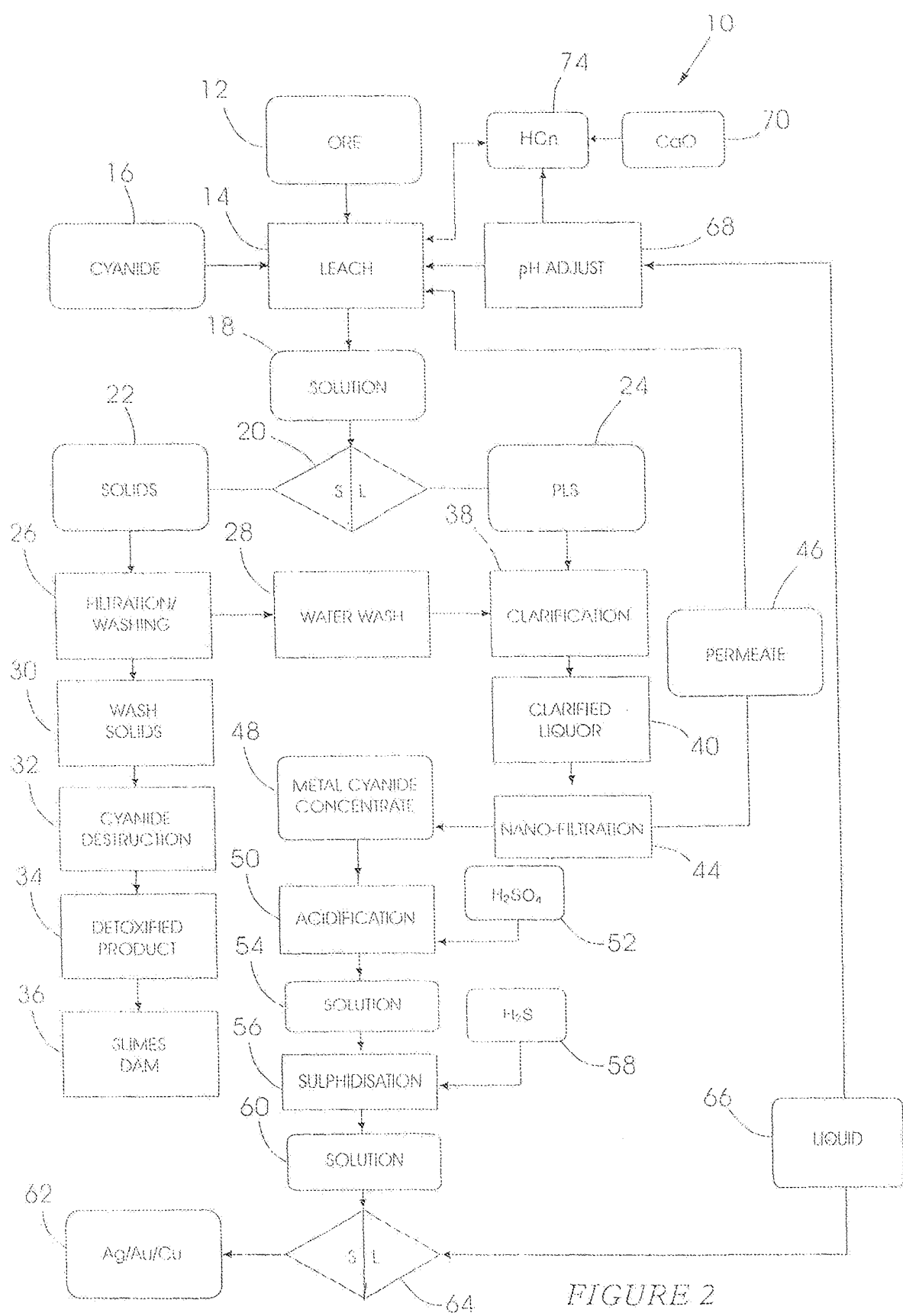
FIG. 2 is a flow sheet of a modified SART process according to the invention.

FIG. 2 of the accompanying drawings illustrates steps in a method 10 according to the invention for the recovery of metals from low grade ores and residues 12. Typically the ores and residues are found in the tailings of sulphide and oxide ores and contain high levels of acid-consuming gangue materials such as calcite, dolomite, calcium, magnesium, aluminium, manganese and iron. The metals in these ores and residues may include precious metals such as gold and silver and base metals such as copper, nickel, cobalt and zinc.

In a first step 14 the ores and residues 12 are subjected to cyanide leaching at an alkaline pH by the addition of cyanide 16. Preferably the pH is between 10 and 11 pH values which are regarded as optimal. The outcome of the cyanide leaching step is a pregnant leach solution 18 which contains at least one metal cyanide i.e. a cyanide of a target metal which may be any one of the aforementioned metals.

The pregnant leach solution 18 is subjected to a solid/liquid separation process 20 which may be effected by means of counter-current decantation, filtration or the like. The process 20 removes barren or leached solids 22 from the solution and produces an upgraded pregnant leach solution 24 which contains the metal cyanide.

To optimise the recovery of the base metal and the free cyanide the solids 22 are washed in a step 26 and a resulting solution is filtered to produce a wash water 28 and washed solids 30.

The washed solids are subjected to a cyanide destruction step 32 to produce a detoxified product 34 which is sent to a slimes dam 36.

The wash water 28 which may contain some of the metal cyanide, and the upgraded pregnant leach solution 24 are subjected to an ultrafiltration or clarification step 38 which produces a clarified liquor 40 which contains the metal cyanide. This is followed by a nano-filtration step 44 during which the metal cyanide is removed from the clarified liquor 40. The nano-filtration step 44 is carried out using an appropriate membrane which has a chosen pore size which allows a permeate 46 of water and sodium cyanide (NaCN) to pass through the membrane. The permeate is then recycled to the step 12.

The pore size of the membrane prevents the metal cyanide from permeating the membrane. The metal cyanide which is thereby concentrated constitutes the retentate 48.

In an acidification step 50 sulphuric acid 52 is added to the retentate 48 to lower the pH of the retentate to a value of between 2 and 6. Once the pH is sufficiently low, the metal cyanide complex dissociates and forms a solution 54 which contains a metal sulphate complex and dissolved hydrogen cyanide.

In a subsequent sulphidisation step 56 hydrogen sulphide 58 (or sodium sulphide in a salt form) is added to the solution 54 to produce a solution 60 which contains a metal sulphide complex 62. This complex 62, which for example may be a copper, gold or silver sulphide product, is recovered from the solution 60 by means of a solid/liquid separation step 64. The metal content may be recovered from the complex using any suitable technique.

The pH of a liquid 66 produced by the step 64 is adjusted in a step 68, for example by the addition of lime 70 (CaO), to a value of between 10 and 11, ie. to the alkaline operating range of the cyanide leaching step 14. Hydrogen cyanide 74 emerging from the step 68 is recycled to the cyanide leaching step 14.

The invention provides a number of significant benefits which include the following:

1. the nano-filtration step 42 effectively removes the high acid consuming free cyanide, thereby reducing the amount of sulphuric acid (56) which is subsequently needed to acidify the retentate;
2. as the permeate 46 is recycled to the step 14 before the alkalizing step 48, the permeate remains at the correct alkaline pH. This reduces the amount of calcium oxide needed to alkalize the liquid 66 and thus to recover the hydrogen cyanide 74;
3. due to the decrease in chemical processing a substantial amount of sodium cyanide is recovered in the permeate, and is recycled to the step 14 to provide a significant reduction in the reagent.
4. the discharge of harmful waste waters in to the environment is reduced.

Figure 1:
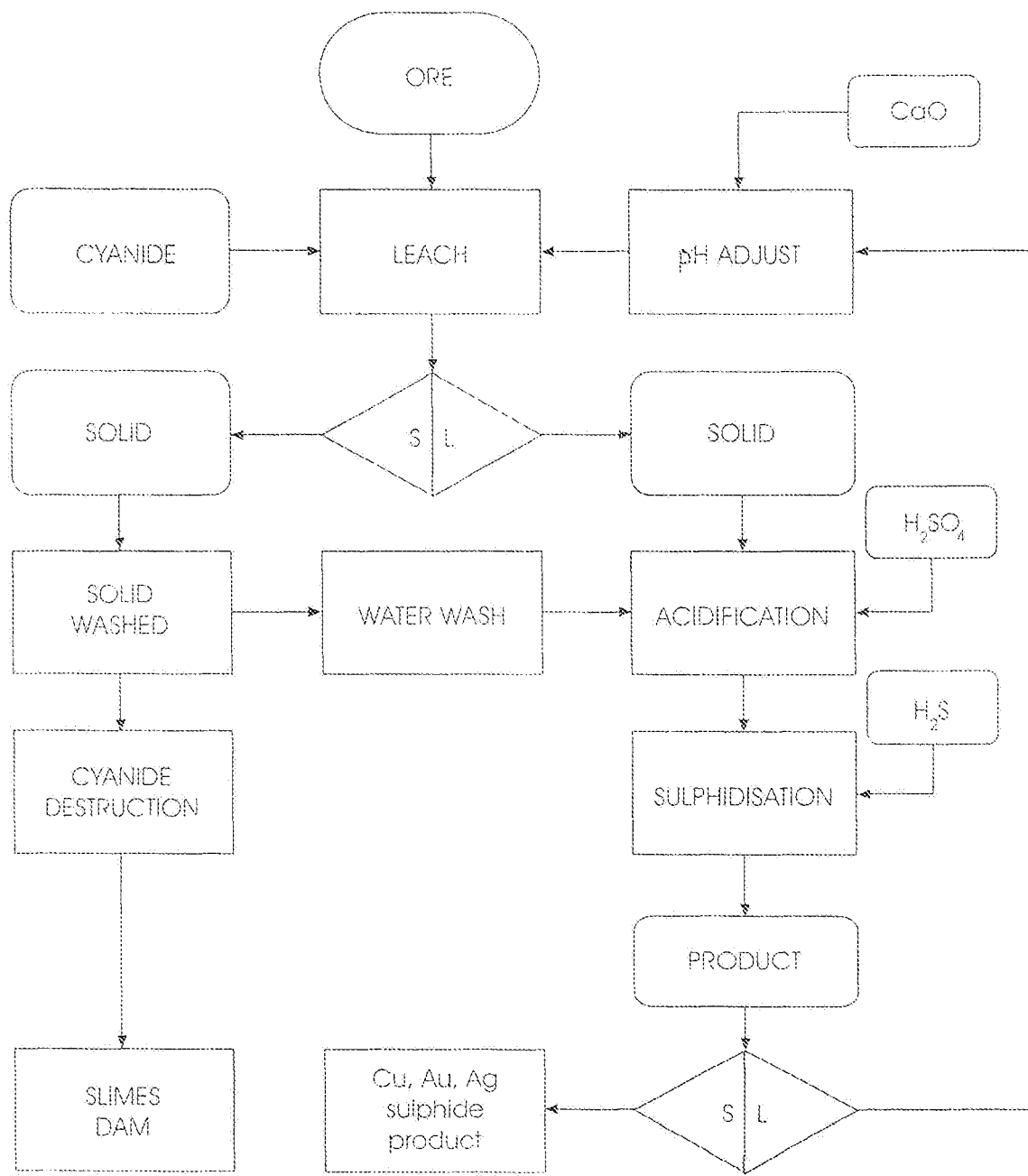
FIG. 1 is a flow sheet of the SART process and has already been described in the preamble to this specification.

The aforementioned benefits produce a substantial saving in operating and capital costs. Table 2 shows the savings in operating expenditure (OPEX) produced by the process according to FIG. 2 when compared to a conventional SART process of the type shown in FIG. 1.

TABLE 2

| Reagent | Reagent prices, R/t | | | |
|---|---|---|---|---|
| $H_2SO_4$, 98% | 1500 | | | |
| CaO | 2500 | | | |
| NaCN | 21000 | | | |

| | Reagent costs, million R/a | | | |
|---|---|---|---|---|
| | $H_2SO_4$ | CaO | NaCN | Total |
| No NaCN recovery | | | 143 | 143 |
| Base case NaCN recovery (FIG. 1) | 10 | 14 | 14 | 38 |
| NaCN recovery via nano-filtration (FIG. 2 and 3) | 1.8 | 1.1 | 3.6 | 6.5 |

Figure 3:
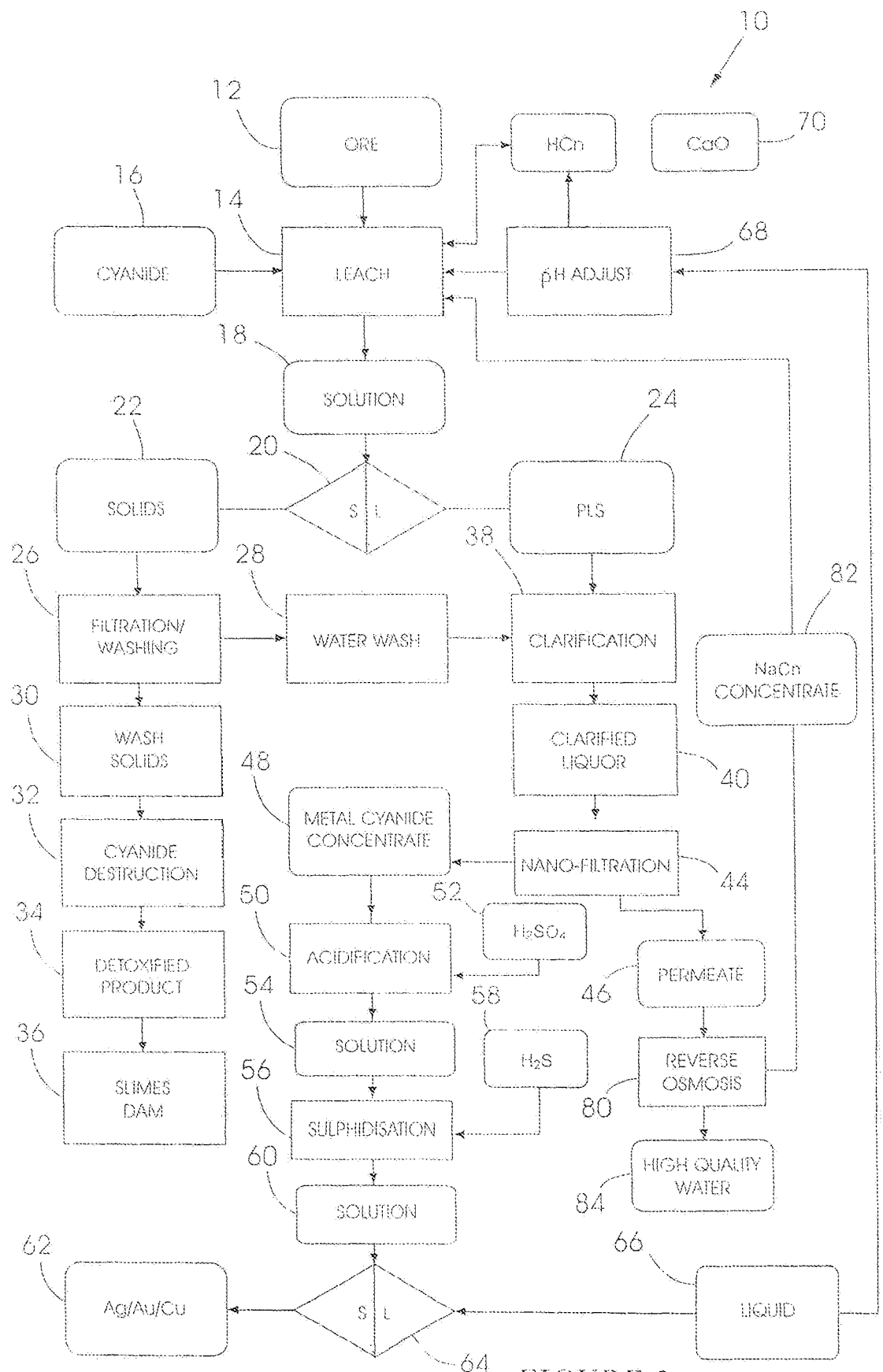
FIG. 3 illustrates a variation to the process in FIG. 2.

FIG. 3 is a flow sheet of a process 10A, which is a modification of that shown in FIG. 2. The processes 10 and 10A have a substantial degree of identity and, as appropriate, like reference numerals are used to designate like materials, components and treatment steps.

In the process 10A the permeate 46 emerging from the nano-filtration step 44 is subjected to a reverse osmosis step 80. This produces a sodium cyanide concentrate 82 and high quality water 84. The concentrate 82 is recycled to the step 14. The modification embodied in the process 10A means that the production of waste water of an unacceptable quality is reduced.

The invention claimed is:

1. A method for the recovery of at least one metal from a low grade metal sulphide ore or residue, wherein the method includes the following steps:
   a) cyanide-leaching the low grade ore or residue, at an alkaline pH of between 10 and 11, to produce a pregnant leach solution which contains at least one metal cyanide;
   b) upgrading the pregnant leach solution by removing leached or barren solids from the pregnant leach solution;
   c) subjecting the upgraded pregnant leach solution to ultrafiltration to produce a clarified liquor;
   d) subjecting the clarified liquor to nano-filtration so as to separate metal cyanide complexes in a retentate from free cyanide in a permeate, thereby to produce a metal cyanide concentrate and a permeate containing free cyanide;
   e) subjecting the permeate to a reverse osmosis process to form a high-quality water stream and a free cyanide concentrate which is recycled to the cyanide leaching step a);
   f) subjecting the metal cyanide concentrate to acidification by the addition of sulphuric acid to lower the pH thereof to a value between 2 and 6 and then to sulphidisation to produce a solution which contains a metal-sulphide and hydrogen cyanide;
   g) subjecting the solution formed in step f) to a solid/liquid separation step, thereby to recover at least some of the metal sulphide and at least some of the hydrogen cyanide; and
   h) recycling the recovered hydrogen cyanide to the cyanide leaching (step a)).

2. A method according to claim 1 wherein the solids removed in step b) are washed and separated wash water is then recycled to the upgraded pregnant leach solution.

3. A method according to claim 1 wherein the metal is a base metal or a precious metal.

4. A method according to claim 1 wherein the metal is copper, nickel, cobalt, zinc, gold or silver.

* * * * *